United States Patent
Song et al.

(10) Patent No.: US 11,146,716 B2
(45) Date of Patent: Oct. 12, 2021

(54) CAMERA MODULE, METHOD FOR MAKING CAMERA MODULE AND ELECTRONIC DEVICE

(71) Applicant: TRIPLE WIN TECHNOLOGY(SHENZHEN) CO. LTD., Shenzhen (CN)

(72) Inventors: Jian-Chao Song, Guangdong (CN); Sheng-Jie Ding, Guangdong (CN); Jing-Wei Li, Guangdong (CN); Shin-Wen Chen, New Taipei (TW); Yu-Shuai Li, Shenzhen (CN)

(73) Assignee: TRIPLE WIN TECHNOLOGY(SHENZHEN) CO. LTD., Shenzhen (CN)

(*) Notice: Subject to any disclaimer, the term of this patent is extended or adjusted under 35 U.S.C. 154(b) by 0 days.

(21) Appl. No.: 16/868,397

(22) Filed: May 6, 2020

(65) Prior Publication Data

US 2021/0127042 A1    Apr. 29, 2021

(30) Foreign Application Priority Data

Oct. 28, 2019  (CN) .......................... 201911030546.0

(51) Int. Cl.
*H04N 5/225* (2006.01)
*H04M 1/02* (2006.01)

(52) U.S. Cl.
CPC ........ *H04N 5/2254* (2013.01); *H04M 1/0264* (2013.01); *H04N 5/2252* (2013.01)

(58) Field of Classification Search
CPC .. H04N 5/2252; H04N 5/2257; H04M 1/0264
See application file for complete search history.

(56) References Cited

U.S. PATENT DOCUMENTS

| | | | |
|---|---|---|---|
| 2012/0038072 A1* | 2/2012 | Huang | B29C 33/424 264/2.5 |
| 2019/0089885 A1* | 3/2019 | Shen | G02B 7/021 |
| 2020/0033626 A1* | 1/2020 | Wu | G03B 3/10 |
| 2020/0099835 A1* | 3/2020 | Chang | H01L 27/14625 |
| 2021/0227112 A1* | 7/2021 | Guo | H04N 5/2252 |

FOREIGN PATENT DOCUMENTS

| | | | | |
|---|---|---|---|---|
| CN | 109525769 A | * | 3/2019 | .......... H04M 1/0264 |
| TW | 201219906 A | | 5/2012 | |

* cited by examiner

*Primary Examiner* — Anthony J Daniels
(74) *Attorney, Agent, or Firm* — ScienBiziP, P.C.

(57) ABSTRACT

A camera module includes a composite base, an optical lens arranged at a first side of the composite base; and a circuit board arranged at a second side of the composite base. The composite base includes a metal frame and a plastic frame. The metal frame includes a plurality of first metal strips connected end to end and at least one second metal strip corresponding extending from part of the plurality of first metal strips. The plastic frame includes a plurality of first plastic strips connected end to end and at least one second plastic strip extending from part of the plurality of first plastic strip. The first plastic strips are fixed to the first metal strips to form a top wall of the composite base, and the second plastic strips are connected to the second metal strips to form a side wall of the composite base.

18 Claims, 7 Drawing Sheets

CAMERA MODULE, METHOD FOR MAKING CAMERA MODULE AND ELECTRONIC DEVICE

FIELD

The subject matter herein generally relates to camera field, and particularly relates to a composite base, a camera module, a method for making the camera module and an electronic device.

BACKGROUND

A camera module of a mobile phone generally includes an optical lens, filters, a base, and a circuit board. The optical lens and the circuit board are arranged at opposite sides of the base. The filters are arranged inside the base. The base is configured to add enough structural strength to support and protect the optical lens and filters from damage due to external force.

Conventionally, structural strength of a base can be improved by increasing length, width, or thickness of the base. However, increasing length, width, or thickness of the base will increase a size of a camera module with the base, which is not in line with the needs of lightweight.

BRIEF DESCRIPTION OF THE DRAWINGS

Implementations of the present disclosure will now be described, by way of embodiment, with reference to the attached figures.

DETAILED DESCRIPTION

Figure 1:
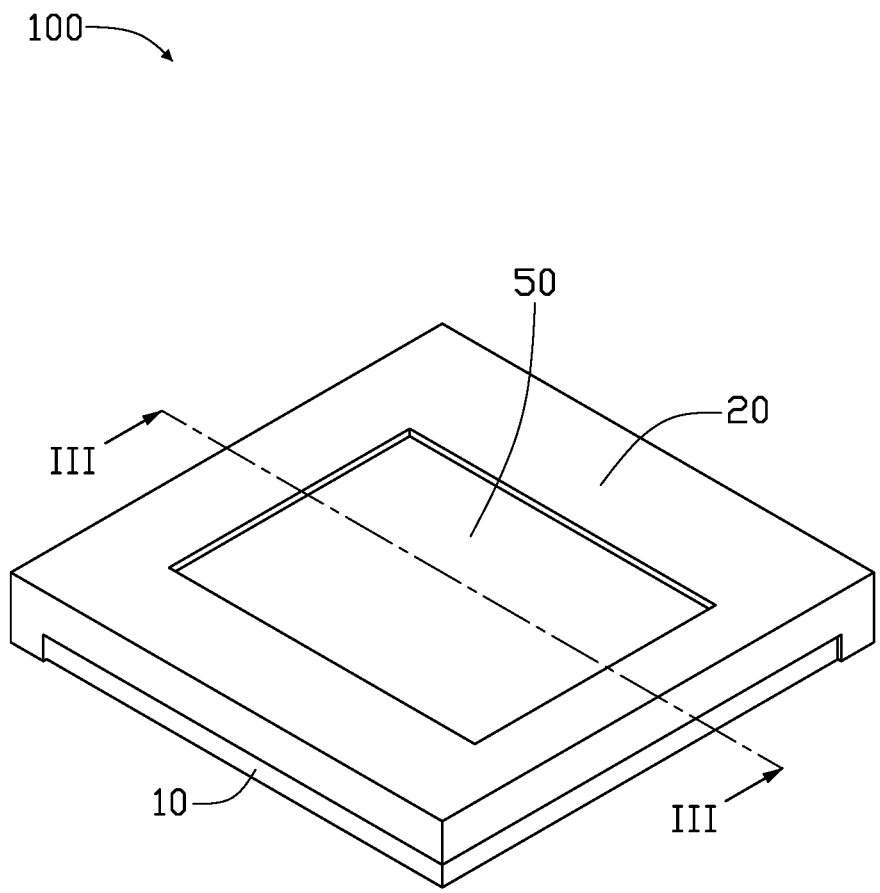
FIG. 1 illustrates an embodiment of a schematic diagram of a composite base including a metal frame.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "multiple" means two or more, unless otherwise specifically defined.

The terms "center", "longitudinal", "horizontal", "length", "width", "thickness", "top", "bottom", "front", "back", "left", "right", "vertical", "horizontal", "top", "bottom", "inside", "outside", "clockwise needle", "anticlockwise" and other indicating directions or positions are based on the directions or positions shown in the attached drawings In order to facilitate the description of the embodiment and simplify the description of the invention, rather than indicating or implying that the device or element referred to must have a specific orientation, be constructed and operated in a specific orientation, it cannot be understood as a limitation of the embodiment of the invention.

Figure 2:
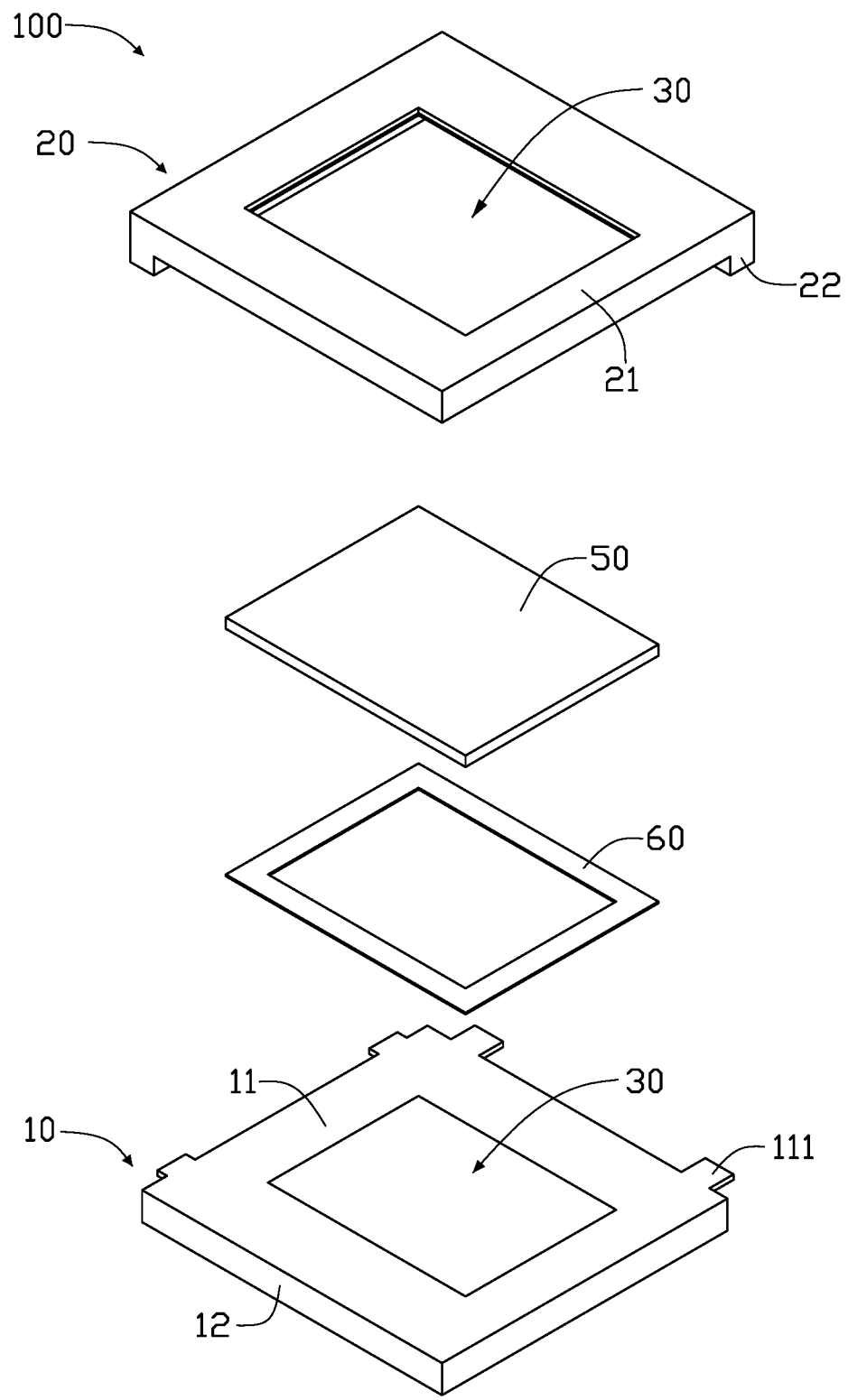
FIG. 2 illustrates an exploded view of the composite base of FIG. 1.
Figure 3:
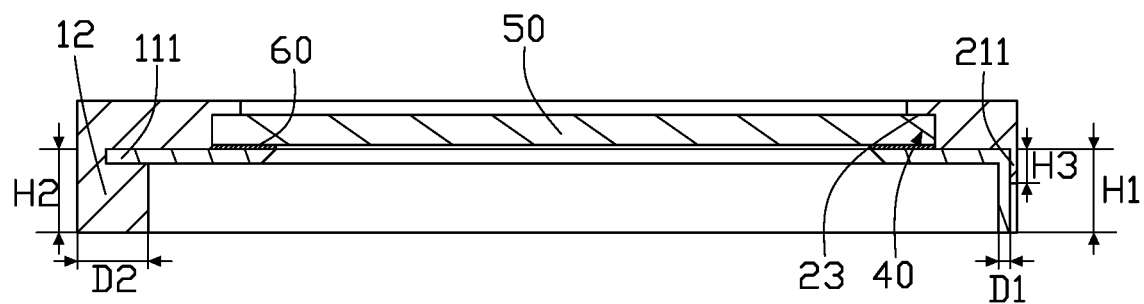
FIG. 3 illustrates a cross sectional view of the composite base of FIG. 1 along a line III-III.

Referring to FIGS. 1-3, an embodiment of the present disclosure provides a composite base 100. The composite base 100 incudes a metal frame 10 and a plastic frame 20 arranged on the metal frame 10. The metal frame 10 incudes a plurality of first metal strips 11 connected end to end and at least one second metal strip 12 extending from part of the plurality of first metal strips 11. The plastic frame 20 includes a plurality of first plastic strips 21 connected end to end and at least one second plastic strip 22 extending from part of the plurality of first plastic strips 21. The plurality of first plastic strips 21 is arranged on the plurality of first metal strips 11 to form a top wall 1 of the composite base 100. The at least one second plastic strip 22 is connected to the at least one second metal strip 12 to form a side wall of the composite base 100. In at least one embodiment, the second metal strips 12 can be perpendicular to the first metal strips 11. The second plastic strips 22 can be perpendicular to the first plastic strips 21. In the embodiment as shown in FIGS. 1-5, the number of the at least one second metal strip 12 is two, and the number of the at least one second plastic strip 22 is two. The two second metal strips 12 extend from two of the plurality of first metal strips 11 respectively, and the two second plastic strips 22 extend from two of the plurality of first plastic strips 21 respectively. The two second metal strips 12 and the two second plastic strips 22 are connected end to end so as to form the side wall of the composite base 100.

By combining the metal frame 10 and the plastic frame 20 to form the composite base 100, structural strength of the composite base 100 can be significantly enhanced, that is, under certain structural strength requirements, it is conducive to reduce an overall size of the composite base 100 (for example, for a pure plastic base with a top wall size of 7 mm×7 mm, a thickness of a side wall should be designed to be 0.4 mm in order to meet the requirement. However, the structural strength requirement can be met if a size of the top wall of the composite base 100 provided in this embodiment is 6.26 mm×6.26 mm and a thickness of the side wall is 0.15 mm.)

In at least one embodiment, a light transmitting area 30 is defined at a center of the top wall 1. A surface of the first plastic strip 21 facing the first metal strip 11 is concave inward near the light transmitting area 30 to form a step part 23. The step part 23 together with the first metal strip 11 form a receiving area 40 communicating with the light transmitting area 30. When a filter 50 is mounted to the composite base 100, the filter 50 may cover the light transmitting area 30. An edge of the filter 50 is received in the receiving area 40. Therefore, the edge of the filter 50 is protected from damage due to external force applied on the composite base 100.

In at least one embodiment, an adhesive layer 60 is arranged between the filter 50 and the plurality of first metal strips 11. The adhesive layer 60 is configured to fill the gap between the filter 50 and the plurality of first metal strips 11.

In at least one embodiment, the first metal strip 11 and the second metal strip 12 are integrally formed. The first plastic strip 21 and the second plastic strip 22 are integrally formed. The first metal strip 11 and the first plastic strip 21 are in a substantial same shape and in a substantial same size. A height H1 of the second metal strip 12 is the same as a height H2 of the second plastic strip 22. A thickness D1 of the second metal strip 12 is less than a thickness D2 of the second plastic strip 22.

In at least one embodiment, the metal frame 10 further includes at least one first protrusion 111 extending from an edge of the first metal strip 11 away from the second metal strip 12. The second plastic strip 22 defines at least one recess (not labelled) corresponding to the at least one first protrusion 111. The at least one first protrusion 111 can be received in the at least one recess, so as to enhance a connection between the metal frame 10 and the plastic frame 20. In the embodiment as shown in FIGS. 1-5, the number of the at least one first protrusion 111 is four. The four first protrusions 111 are arranged at two of the plurality of first metal strips 11 which are not connected with the second metal strips 12.

In at least one embodiment, the first protrusions 111, the first metal strips 11, and the second metal strips 12 are integrally formed.

In at least one embodiment, the plastic frame 20 further includes at least one second protrusion 211 extending from part of the first plastic strip 21 which is not connected with the second plastic strips 22. A direction along which the second protrusion 211 extends is same as a direction along which the second plastic strip 22 extends. That is, the second protrusion 211 is substantially perpendicular to the first plastic strip 21. The second plastic strip 22 is in contact with a side surface of the second metal strip 12 away from the light transmitting area 30. A height H3 of the second protrusion 211 is less than the height H1 of the second metal strip 12, thus making part of the second metal strip 12 exposed from the second protrusion 211, so as to enhance a connection between the metal frame 10 and the plastic frame 20.

In at least one embodiment, the second protrusion 211, the first plastic strip 21, and the second plastic strip 22 are integrally formed.

An embodiment of the present disclosure further provides a method for making the composite base 100 with the filter 50 mounted thereon.

In at least one embodiment, the method can include S1, S2, and S3 as blow.

Figure 4:
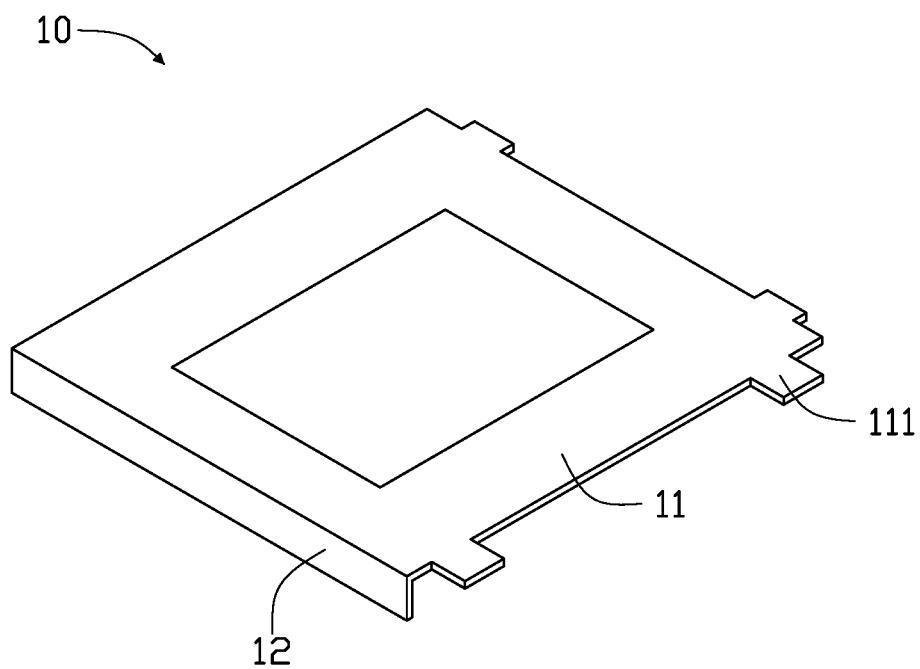
FIG. 4 illustrates a schematic diagram of the metal frame of the composite base of FIG. 1.

S1: providing the metal frame 10. Referring to FIG. 4, the metal frame 10 includes the plurality of first metal strip 11, the at least one second metal strip 12, and the at least one first protrusion 111.

Figure 5:
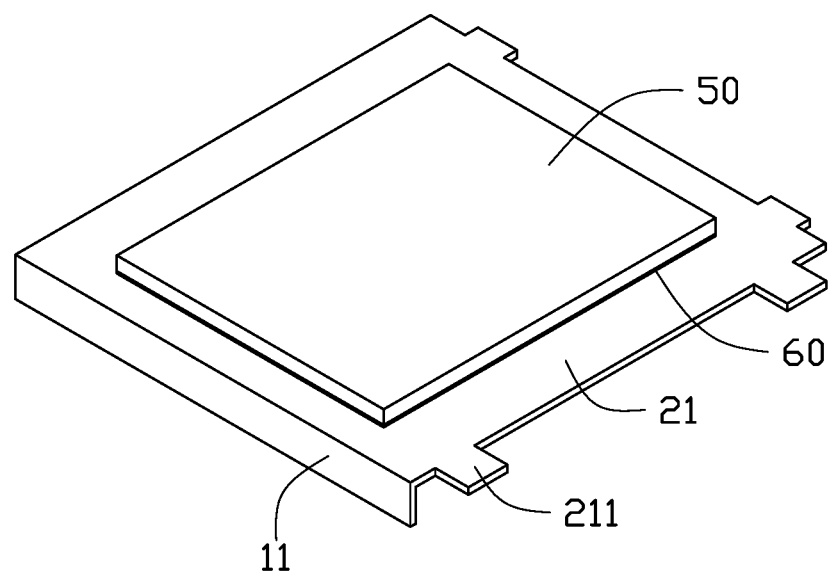
FIG. 5 illustrates a schematic diagram of the metal frame in FIG. 4 with a filter arranged thereon.

S2: fixing the filter 50 to the metal frame 10. Referring to FIG. 5, the filter 50 is fixed to the metal frame 10 through the adhesive layer 60.

S3: providing a mold (not shown) including a male mold (not shown) and a female mold (not shown) corresponding to the male mold, placing the metal frame 10 with the filter 50 fixed thereon between the male mold and the female mold, injecting molten injection into the mold, and opening the mold to obtain the composite base 100 after the mold is cooled.

Figure 6:
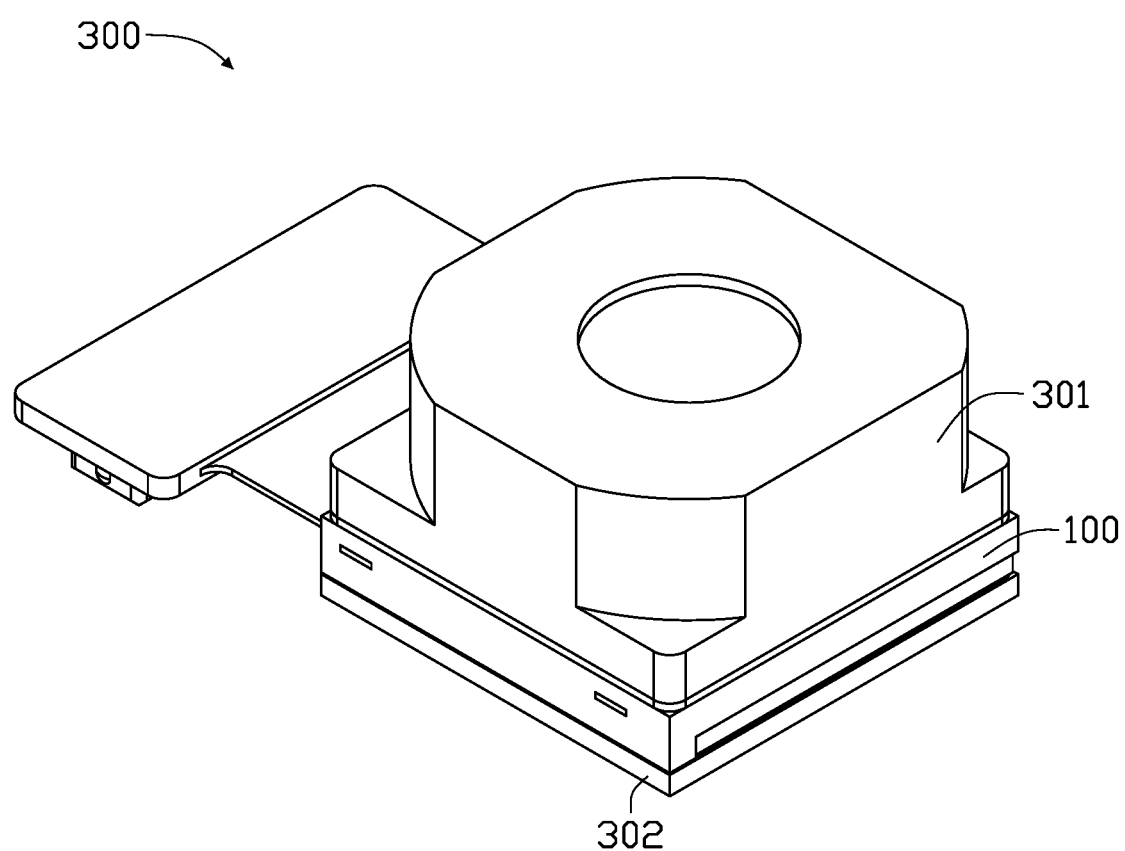
FIG. 6 illustrates an embodiment of a schematic diagram of a camera module.

Referring to FIG. 6, an embodiment of a camera module 300 is shown. The camera module 300 includes an optical lens 301, the composite base 100, and a circuit board 302. The optical lens 301 is arranged at a first side of the composite base 100, and the circuit board 302 is arranged at a second side of the composite base 100 away from the first side. The filter 50 is mounted inside the composite base 100.

Figure 7:
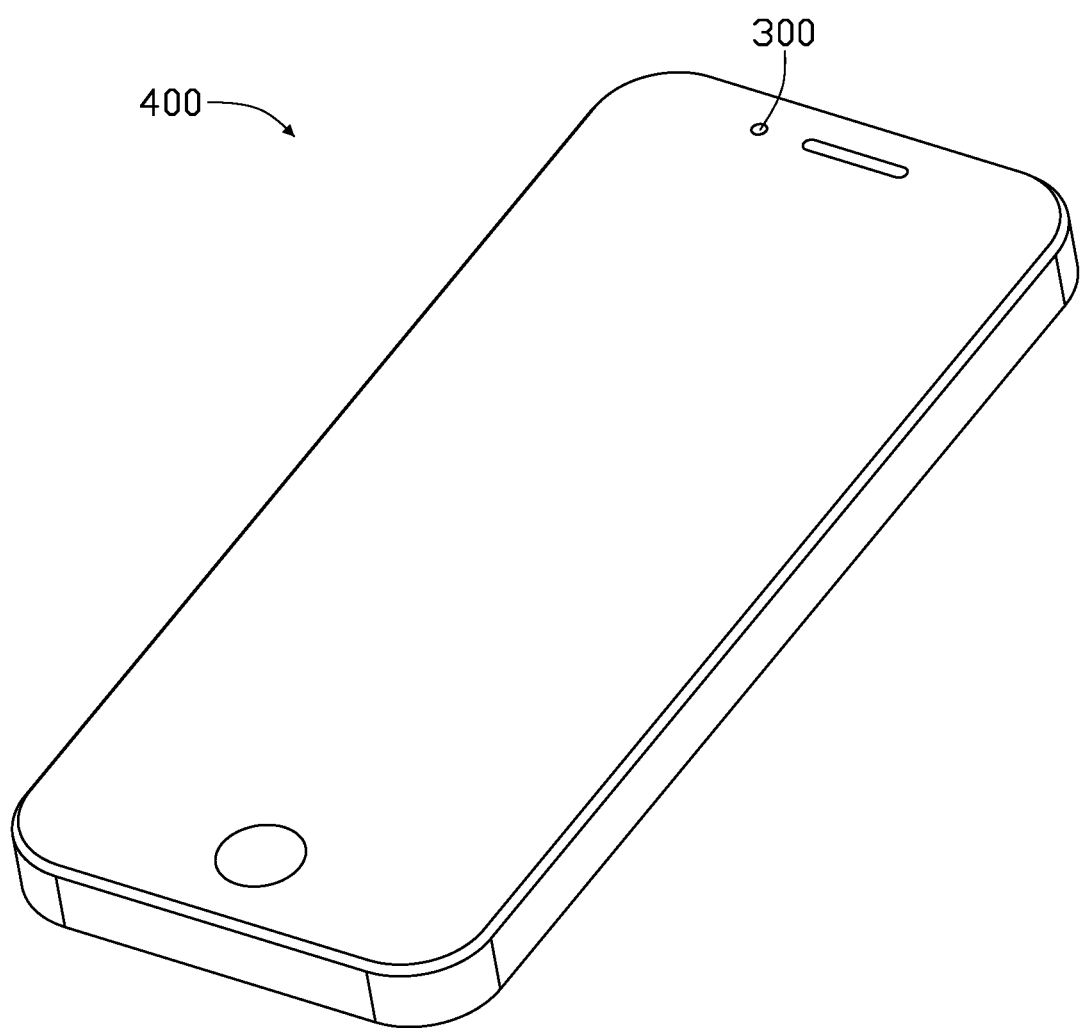
FIG. 7 illustrates an embodiment of a schematic diagram of an electronic device.

Referring to FIG. 7, an embodiment of an electronic device 400 is shown. The electronic device 400 includes the camera module 300. The electronic device 400 can be, but is not limited to, a mobile phone, a notebook, a desktop computer, a game machine, and a wearable device.

The metal frame 10 and the plastic frame 20 are fixed to form the top wall and the side wall of the composite base 100, thus capable of enhancing the structural strength of the composite base 100, and reducing the overall size of the composite base 100.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A camera module, comprising:
a composite base;
an optical lens arranged at a first side of the composite base; and
a circuit board arranged at a second side of the composite base;
wherein the composite base comprises:
a metal frame, the metal frame comprises a plurality of first metal strips connected end to end and at least one second metal strip extending from part of the plurality of first metal strips; and
a plastic frame, the plastic frame comprises a plurality of first plastic strips connected end to end and at least one second plastic strip extending from part of the plurality of first plastic strips;
wherein the plurality of first plastic strips is fixed to the plurality of first metal strips to form a top wall of the composite base, and the at least one second plastic strip is connected to the at least one second metal strip to form a side wall of the composite base; a thickness of each of the at least one second metal strip is less than a thickness of each of the at least one second plastic strip.

2. The camera module according to claim 1, wherein the plurality of first metal strips and the at least one second metal strips are integrally formed and/or the plurality of first plastic strips and the at least one second plastic strips are integrally formed.

3. The camera module according to claim 1, wherein a height of the at least one second metal strip is substantially equal to a height of the at least one second plastic strip.

4. The camera module according to claim 1, wherein a first protrusion extends from an edge of one of the plurality of first metal strips towards the at least one second plastic strip, and the first protrusion is fixed to the at least one second plastic strip.

5. The camera module according to claim 1, wherein a second protrusion extends from edges of part of the plurality of first plastic strips which are not connected with the at least one second plastic strip, the second protrusion is substantially parallel to the at least one second plastic strip, and the second protrusion is in contact with part of the at least one second metal strip.

6. The camera module according to claim 5, wherein a height of the second protrusion is less than a height of the at least one second metal strip.

7. The camera module according to claim 1, wherein a light transmitting area is defined at a center of the top wall, a surface of a first plastic strip facing the plurality of first metal strips is concave inward near the light transmitting area to form a step part, the step part together with the plurality of first metal strips form a receiving area communicating with the light transmitting area.

8. The camera module according to claim 7, further comprising a filter covering the light transmitting area, wherein an edge of the filter is received in the receiving area.

9. The camera module according to claim 7, wherein an adhesive layer is arranged between the filter and the plurality of first metal strips.

10. An electronic device comprising a camera module, the camera module comprising:
a composite base;
an optical lens arranged at a first side of the composite base; and
a circuit board arranged at a second side of the composite base;
wherein the composite base comprises:
a metal frame, the metal frame comprises a plurality of first metal strips connected end to end and at least one second metal strip extending from part of the plurality of first metal strips; and
a plastic frame, the plastic frame comprises a plurality of first plastic strips connected end to end and at least one second plastic strip extending from part of the plurality of first plastic strips;
wherein the plurality of first plastic strips is fixed to the plurality of first metal strips to form a top wall of the composite base, and the at least one second plastic strip is connected to the at least one second metal strip to form a side wall of the composite base; a thickness of each of the at least one second metal strip is less than a thickness of each of the at least one second plastic strip.

11. The electronic device according to claim 10, wherein the plurality of first metal strips and the at least one second metal strip are integrally formed and/or the plurality of first plastic strips and the at least one second plastic strip are integrally formed.

12. The electronic device according to claim 10, wherein a height of the at least one second metal strip is substantially equal to a height of the at least one second plastic strip.

13. The electronic device according to claim 10, wherein a first protrusion extends from an edge of one of the plurality of first metal strips towards the at least one second plastic strip, and the first protrusion is fixed to the at least one second plastic strip.

14. The electronic device according to claim 10, wherein a second protrusion extends from edges of part of the plurality of first plastic strips which are not connected with the at least one second plastic strip, the second protrusion is substantially parallel to the at least one second plastic strip, and the second protrusion is in contact with part of the at least one second metal strip.

15. The electronic device according to claim 14, wherein a height of the second protrusion is less than a height of the at least one second metal strip.

16. The electronic device according to claim 10, wherein a light transmitting area is defined at a center of the top wall, a surface of a first plastic strip facing the plurality of first metal strips is concave inward near the light transmitting area to form a step part, the step part together with the plurality of first metal strips form a receiving area communicating with the light transmitting area.

17. The electronic device according to claim 16, further comprising a filter covering the light transmitting area, wherein an edge of the filter is received in the receiving area.

18. A method for making a camera module comprising:
providing a metal frame, the metal frame comprises a plurality of first metal strips and at least one second metal strip extending from part of the plurality of first metal strips;
fixing a filter to the metal frame;
placing the metal frame with the filter fixed thereon between a male mold and a female mold, injecting molten injection to obtain a composite base, the composite base comprises a plastic frame integrally formed on the metal frame, the plastic frame comprises a plurality of first plastic strips connected end to end and at least one second plastic strip extending from part of the plurality of first plastic strips;
fixing a lens module and a circuit board respectively at two opposite sides of the composite base to obtain the camera module.

* * * * *